United States Patent [19]
Morikawa

[11] Patent Number: 5,699,490
[45] Date of Patent: Dec. 16, 1997

[54] METHOD OF AND APPARATUS FOR GENERATING CORRECTION TABLE FOR IMAGE PROCESSING USING THE LEAST SQUARE METHOD

[75] Inventor: Seiichiro Morikawa, Kanagawa-ken, Japan

[73] Assignee: Fuji Photo Film Co. Ltd., Kanagawa, Japan

[21] Appl. No.: 162,762

[22] Filed: Dec. 7, 1993

[30] Foreign Application Priority Data

Jan. 19, 1993 [JP] Japan ............................. 5-6796

[51] Int. Cl.$^6$ ............................................. G06F 15/00
[52] U.S. Cl. ............................... 395/109; 358/534
[58] Field of Search ............................. 395/101, 109, 395/117, 131, 127, 800; 358/515, 517, 518, 519, 521, 525, 501, 530, 534, 536, 458, 459; 348/572, 674, 676; 382/237, 265, 267, 276, 277, 302

[56] References Cited

U.S. PATENT DOCUMENTS

| | | | |
|---|---|---|---|
| 4,841,362 | 6/1989 | Urabe et al. | 358/521 |
| 5,103,298 | 4/1992 | Kashimura et al. | 348/572 |
| 5,175,621 | 12/1992 | Maesato | 348/676 |
| 5,309,526 | 5/1994 | Pappas et al. | 358/430 |
| 5,311,332 | 5/1994 | Imao et al. | 358/518 |
| 5,373,567 | 12/1994 | Tauahashi et al. | 382/216 |

*Primary Examiner*—Edward L. Coles, Sr.
*Assistant Examiner*—Gabriel I. Garcia
*Attorney, Agent, or Firm*—Sughrue, Mion, Zinn, Macpeak & Seas, PLLC

[57] ABSTRACT

To produce a correction table to be referred to when a quantum level data (QL data) as an input image data to a given image output device is converted into an image having a halftone dot percentage, reference QL data having a plurality of data values arranged at predetermined data intervals are inputted to the image output device; the halftone dot percentage of an output image from the image output device are measured; an approximation formula of a desired function form is determined to approximate the measured halftone dot percentage by the method of least squares, on the condition that the formula should go through preset starting and ending points; and the correction table is produced based on the resulted approximation formula.

12 Claims, 6 Drawing Sheets

METHOD OF AND APPARATUS FOR GENERATING CORRECTION TABLE FOR IMAGE PROCESSING USING THE LEAST SQUARE METHOD

BACKGROUND OF THE INVENTION

1. Field of the Invention

The present invention relates to a method of and an apparatus for producing a correction table for use in an image processing system.

2. Description of the Related Art

In the printing and platemaking industries, in order to make the operation efficient and improve the image quality, an image reading and reproducing system is widely used, in which image information recorded on an original is electrically processed in an image processing device and outputted to an image output device for producing a master film.

In such an image processing device, image data read from an original is processed for sharpness, gradation, color correction, and trimming, for example, and the processed image data is outputted to the image output device. An output signal with respect to the image density from the image processing device is quantized in 256 steps, for example. Such an image data signal is called as a quantum level data (referred to as "QL data").

An image is reproduced in the image output device based on the QL data, and an exposure of the reproduced image is given to the film to produce a master film. In this stage, an image having a halftone dot percentage different from that specified by the QL data, other than a 50 halftone dot % image for example, corresponding to a value 128 of the QL data, can be reproduced depending on the output characteristics of the image output device. In such a situation, a correction table for adjusting the values of the QL data in advance is used so that a satisfactory image having a desired halftone dot percentage is reproduced by the image output device.

To produce such a correction table, input/output characteristics of the image output device must be known. For this purpose, a QL data having known various levels is first given to the image output device, and images reproduced from the QL data are exposed to the film so as to produce a test pattern, so-called a step-wedge. Then, the halftone dot percentage in the step-wedge is measured, and the measured halftone dot percentage data are correlated with the input QL data to know the input/output characteristics of the image output device.

Since the measurement of the halftone dot percentage in the step-wedge making procedure needs a laborious work, infinitely fine steps in the input QL data may not be justified. Therefore, coarsely spaced measured data points are interpolated. Linear interpolation which ties the data points with straight line segments, Lagrange interpolation applied to each data interval, Hermite interpolation, spline interpolation, etc. are used for this purpose. In any case, a formula is given as a segmentwise function for each data interval.

The measured input/output characteristics of the image output device can be used to produce the correction table which gives a required level of the input QL data to obtain an output image having a desired halftone dot percentage. An original QL data outputted from the image processing device is corrected by use of the correction table to a QL data which is actually given to the image output device and converted therein to an output image having a halftone dot percentage which is a high fidelity reproduction of the original QL data. However, the conventional processes are disadvantageous in that since the data are interpolated segmentwise over each of the data intervals, a local distortion may arise as shown in FIG. 6, if the halftone dot percentage data on the measured spots suffer an error.

If an approximation formula is determined by merely using the method of least squares, then the resulted function formula may be such that does not pass through a prescribed starting point Pa (minimum value) and a prescribed ending point Pb (maximum value) as shown in FIG. 7. When this drawback occurs, and a correction table is produced based on such an approximation formula, a problem may arise that a precise expression of a shadow spot or a highlight spot in the reproduced image cannot be attained.

SUMMARY OF THE INVENTION

It is therefore an object of the present invention to provide a method of and an apparatus for producing a correction table in which local distortions does not occur even if measured data contain errors and with which a shadow spot or a highlight spot in the reproduced image can be expressed precisely.

According to the present invention, there is provided a method of producing a correction table to be referred to when an input image data having a first attribute is converted into an image data having second attribute data, which comprises steps of: measuring values of the first attribute data obtained by processing, with a given image output device, reference image data of the second attribute having a plurality of data values arranged at predetermined data intervals; determining an approximation formula of a desired function form for approximating the measured values of the first attribute data by the method of least squares, on the condition that the formula should pass through preset starting and ending points; and producing the correction table based on said approximation formula.

In the above method, the desired form of the approximation formula may be a polynomial of a prescribed degree, and the step of determining the approximation formula may comprise steps of: determining the maximum difference between the measured values and corresponding approximation values calculated according to the polynomial; incrementing the degree of the polynomial by 1, if the determined maximum difference exceeds a predetermined allowable range; repeating the step of determining the approximation formula until the maximum difference falls within the allowable range; and determining the polynomial with a degree at the time the maximum difference falls within the allowable range as being a resulted approximation formula.

According to the present invention, there is also provided an apparatus for producing a correction table to be referred to when an input image data having a first attribute is converted into an image having second attribute data, which comprises means for effecting every step of the method described in the above.

With the above arrangement, by processing reference image data of the second attribute (e.g., QL data) having a plurality of data values arranged at predetermined data intervals with a given image output device, an image having the first attribute data (e.g., halftone dot percentage) is produced and the data values are measured. An approximation formula is then determined by the method of least squares which approximates the measured values on the condition that the formula passes through a starting point (e.g., a shadow spot) and an ending point (e.g., a highlight spot).

As the correction table is produced based on the approximation formula determined in such a manner, the shadow and highlight spots in the reproduced image can be precisely expressed.

A polynomial with a prescribed degree is solved as an approximation formula which passes through the starting and ending points, and the maximum difference is calculated between the first attribute data values and corresponding approximation values calculated according to the polynomial. The degree of the polynomial is repeatedly incremented by 1 until the maximum difference falls within a predetermined allowable range. A resultant approximation formula is determined as being the polynomial with a degree at the time the maximum difference falls within the allowable range.

As the approximation formula is determined in the manner described above, a polynomial with a possible lowest degree can be selected, and the time for determining the formula is also reduced.

The above and other objects, features, and advantages of the present invention will become apparent from the following description when taken in conjunction with the accompanying drawings which illustrate a preferred embodiment of the present invention by way of example.

DETAILED DESCRIPTION OF THE PREFERRED EMBODIMENT

Figure 2:
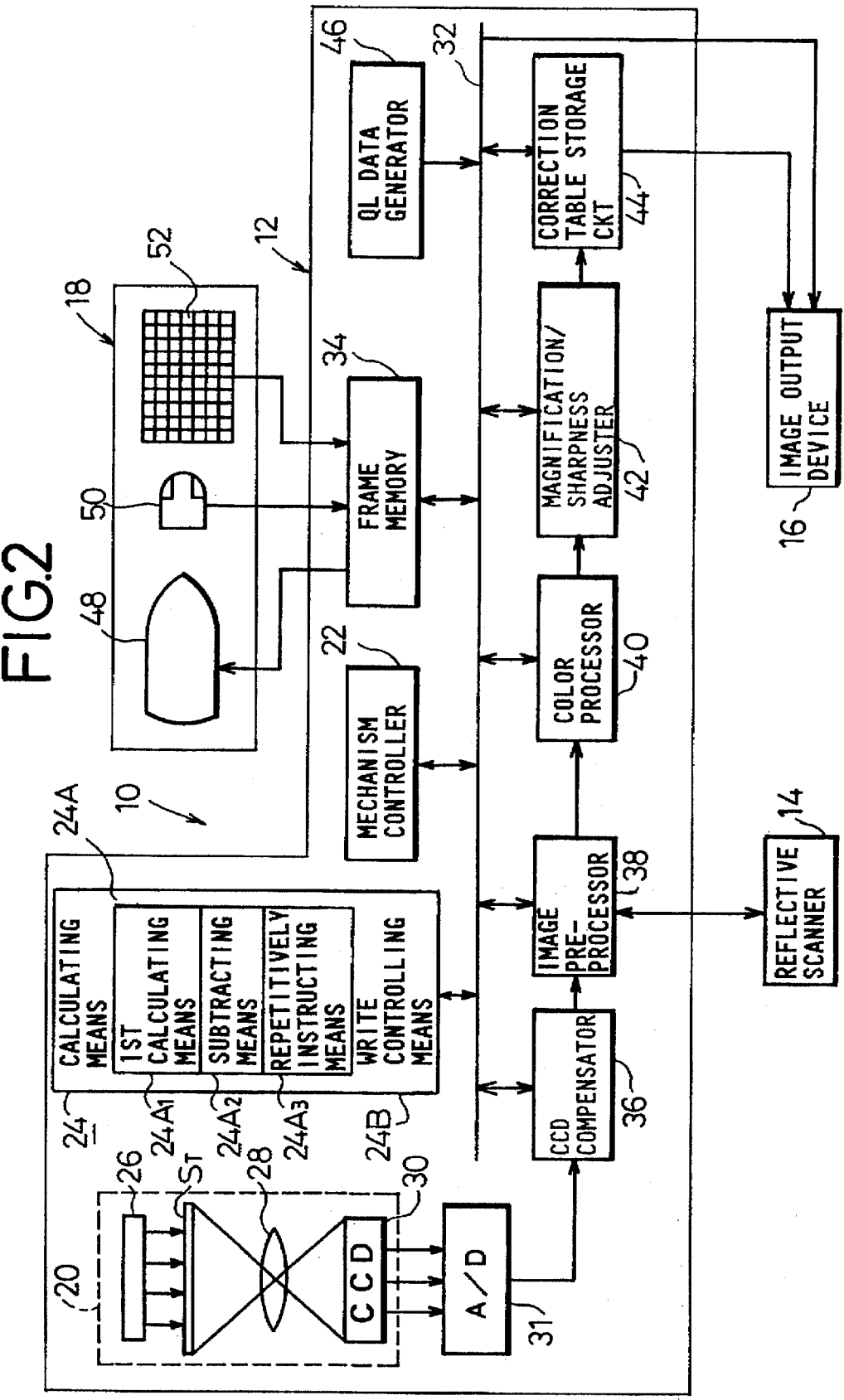
FIG. 2 is a block diagram of a transmissive scanner in an image processing system which incorporates a method and an apparatus according to the present invention.

FIG. 2 shows an image reading, recording, and reproducing system 10 as an image processing system which incorporates a method and an apparatus according to the present invention. The image reading, recording, and reproducing system 10 generally comprises a transmissive scanner 12 for reading image information that is recorded on a transparent copy such as a reversal film, a reflective scanner 14 for reading image information that is recorded on a reflection copy such as a color photograph, an image output device 16 for reproducing and outputting, on a film, the image information that has been read by the transmissive scanner 12 or the reflective scanner 14, and a console unit 18 for controlling the transmissive scanner 12, the reflective scanner 14, and the image output device 16.

The transmissive scanner 12 primarily comprises an image reader 20 for reading image information recorded on a transparent copy $S_T$, a mechanism controller 22 for controlling operation of the mechanism of the transmissive scanner 12, and a central processing unit (CPU) 24 for controlling the transmissive scanner 12 in its entirety, calculations according to a function formula to generate a correction table, and the generation of such a correction table. The image reader 20 comprises a light source 26 for applying illuminating light to the transparent copy $S_T$, a condensing lens 28 for converging the illuminating light that has passed through the transparent copy $S_T$, and a charge-coupled device (CCD) unit 30 for converting the illuminating light falling thereon into electric image signals representing three primaries, R, G, B. The CCD unit 30 supplies the image signals to an analog-to-digital (A/D) converter 31, which converts the supplied image signals into digital image data.

The mechanism controller 22 and the CPU 24 are connected to a system bus 32. To the system bus 32, there are also connected a frame memory 34, a CCD compensator 36, an image pre-processor 38, a color processor 40, a magnification/sharpness adjuster 42, a correction table storage circuit 44, and a QL data generator 46 for generating QL data as pattern data. The frame memory 34 temporarily stores image information that is read by the image reader 20, and supplies the stored image information to a CRT display unit 48 of the console unit 18. The console unit 18 also has input ports including a mouse 50 and a keyboard 52.

The CCD compensator 36, the image pre-processor 38, the color processor 40, the magnification/sharpness adjuster 42, the correction table storage circuit 44, and the QL data generator 46 perform functions, described below, under the control of the CPU 24.

The CCD compensator 36 effects CCD dark-current correction and shading correction on the image data supplied from the A/D converter 31. The image pre-processor 38 converts output data from the CCD compensator 36 into density value data in the scanner, and also switches between the image data from the transmissive scanner 20 and the image data from the reflective scanner 14. The color processor 40 effects desired color processing on the image data outputted from the image pre-processor 38 based on image processing conditions. The magnification/sharpness adjuster 42 adjusts the magnification and sharpness of the image data outputted from the color processor 40.

The correction table storage circuit 44 stores a table of QL data with respect to halftone dot percentage data. In response to the halftone dot percentage data outputted from the magnification/sharpness adjuster 42, the correction table storage circuit 44 reads and outputs QL data corresponding to the supplied halftone dot percentage data.

The QL data generator 46 successively output QL data, e.g., QL data having values in 20 divisions of a range from 0 to 255, in response to an instruction.

The CPU 24 functionally has a calculating means 24A and a write controlling means 24B. Responsive to halftone dot percentage data, from the keyboard 52, which are measured on an image produced by the image output device 16 that is supplied with reference image data at certain intervals from the QL data generator 46, the calculating means 24A calculates a curve in a least square approximation which passes through a starting point Pa and an ending point Pb that are determined in advance with respect to spots of the measured halftone dot percentage data. The write controlling means 24B produces image data with respect to the halftone dot percentage data based on the curve calculated by the calculating means 24A, and stores the produced image data in the correction table storage circuit 44.

The calculating means 24A functionally has a first calculating means $24A_1$ for solving a predefined polynomial as a polynomial with a predetermined degree on the condition that it passes through preset starting and ending points, a subtracting means $24A_2$ for determining the difference between values of the measured halftone dot percentage data and corresponding values that are determined according to the polynomial with a predetermined degree solved by the first calculating means $24A_1$, and a repetitively instructing means $24A_3$ for, if the difference falls out of a predetermined range, incrementing the degree of the polynomial by 1 and repetitively controlling the first calculating means $24A_1$ and the subtracting means $24A_2$ to effect calculations and subtractions until the difference falls in the predetermined range.

Figure 3:
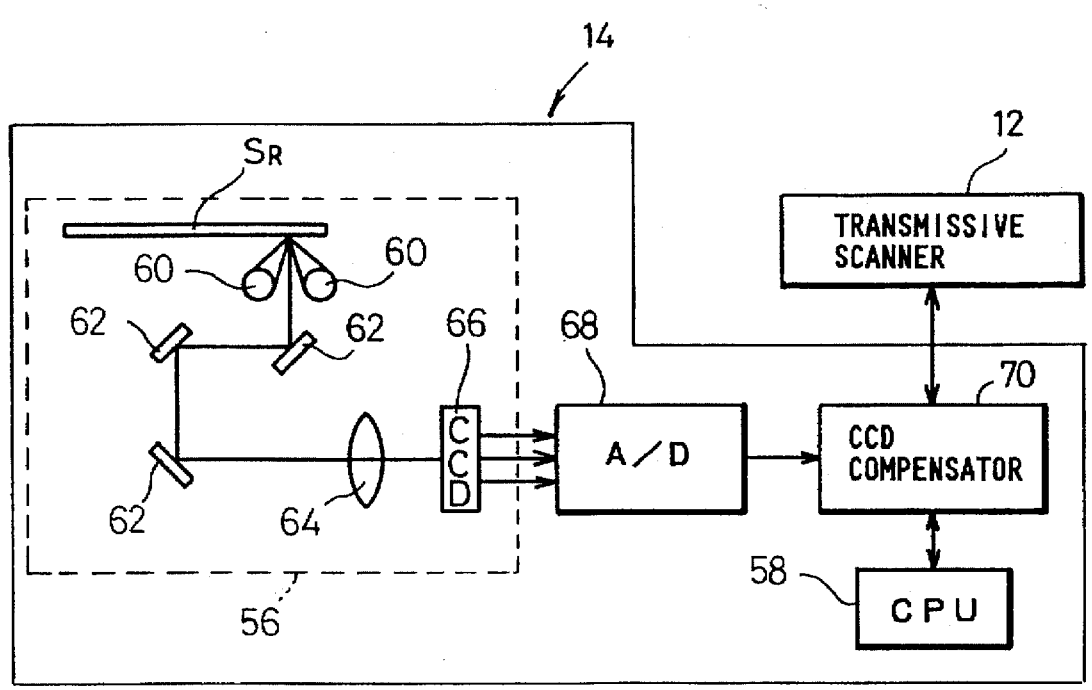
FIG. 3 is a block diagram of a reflective scanner in the image processing system which incorporates the method and the apparatus according to the present invention.

FIG. 3 shows the reflective scanner 14 in block form. The reflective scanner 14 primarily comprises an image reader 56 for reading image information recorded on a reflection copy $S_R$ and a CPU 58 for controlling the reflective scanner 14 in its entirety. The image reader 56 comprises light sources 60 for applying illuminating light to the reflection copy $S_R$, a plurality of reflecting mirrors 62 for directing, into a predetermined direction, illuminating light that is reflected by the reflection copy $S_R$, a condensing lens 64 for converging the reflected illuminating light, and a CCD unit 66 for converting the illuminating light falling thereon into electric image signals representing three primaries, R, G, B. The CCD unit 66 supplies the image signals to an A/D converter 68, which converts the supplied image signals into digital image data.

A CCD compensator 70 which is connected to the CPU 58 effects CCD dark-current correction and shading correction on the image data supplied from the A/D converter 68, and outputs the corrected image data to the image pre-processor 38 in the transmissive scanner 12. Thus, the image data read by the reflective scanner 14 is processed thereafter in the transmissive scanner 12 shown in FIG. 2.

Figure 4:
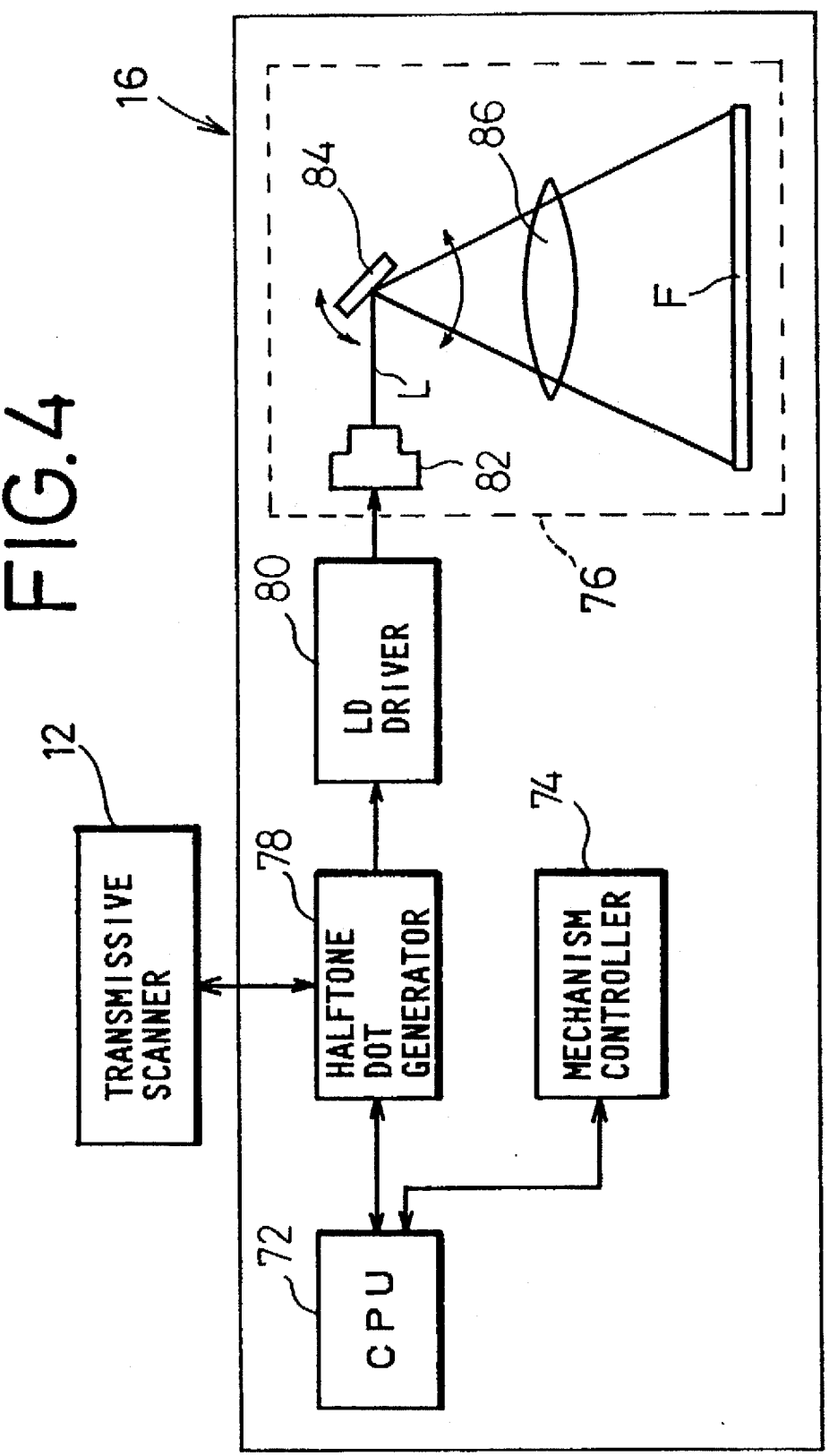
FIG. 4 is a block diagram of an image output device in the image processing system which incorporates the method and the apparatus according to the present invention.

FIG. 4 shows the image output device 16 in block form. The image output device 16 primarily comprises a CPU 72 for controlling the image output device 16 in its entirety, a mechanism controller 74 for controlling operation of the mechanism of the image output device 16, and an image recorder 76 for recording image information on a film F. The CPU 72 is connected to a halftone dot generator 78 which generates a halftone dot signal from the image data supplied from the correction table storage circuit 44 or the QL data generator 46 in the transmissive scanner 12. The generated halftone dot signal is supplied to a laser diode (LD) driver 80. The LD driver 80 energizes a laser diode 82 in the image recorder 76 based on the supplied halftone dot signal. The image recorder 76 comprises, in addition to the laser diode 82, a light deflector 84 for deflecting and scanning a laser beam L in a main scanning direction, and a condensing lens 86 for converging the deflected laser beam L onto the film F.

A process of generating a correction table in the image reading, recording, and reproducing system 10 will be described below.

When it is necessary to newly generate a correction table as when the image output device 16 is updated or a new image output device 16 is connected, a key on the keyboard 52 is pressed to execute a correction table generating routine.

When the correction table generating routine is started, QL data are generated in a successively increasing order, e.g., 21 QL data of "0", "13", "26", "38", . . . , are successively generated, by the QL data generator 46, and outputted to the image output device 16.

Figure 5:
FIG. 5 is a fragmentary diagram showing a produced step-wedge by way of example.
Figure 6:
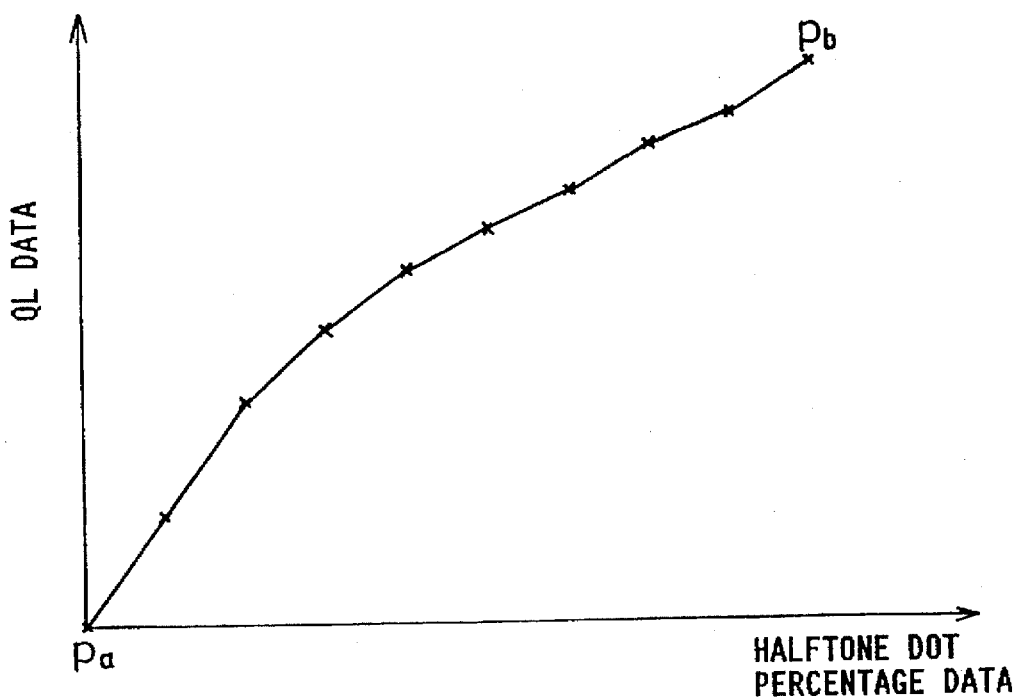
FIG. 6 is a diagram illustrative of interpolation of halftone dot percentage data and QL data according to a conventional process.
Figure 7:
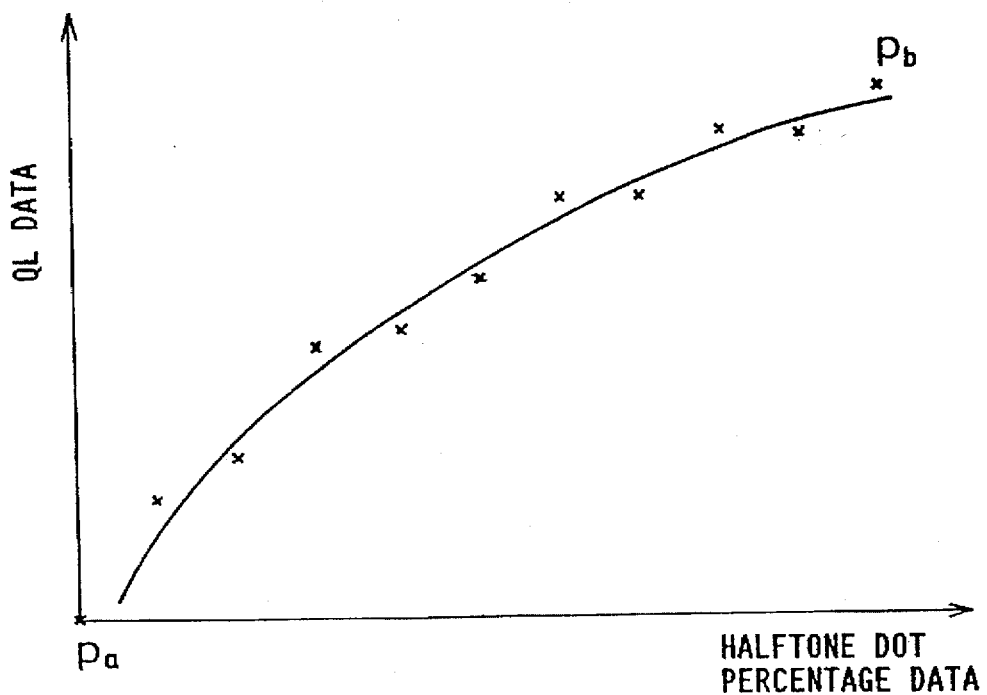
FIG. 7 is a diagram illustrative of interpolation of halftone dot percentage data and QL data according to another conventional process.

In response to the supplied QL data, the halftone dot generator 78 generates halftone dot data under the control of the CPU 72, and outputs the generated halftone dot data to enable the LD driver 80 to energize the laser diode 82. The laser diode 82 emits a laser beam L based on the halftone dot data. The emitted laser beam L is deflected by the light deflector 84 and converged by the condensing lens 86 onto the film F, thereby forming a step-wedge on the film F. FIG. 5 shows such a formed step-wedge by way of example.

The halftone dot percentage data of respective steps of the step-wedge which is generated in the correction table generating routine are read by a separate measuring unit. The measured halftone dot percentage data are then inputted into the frame memory 34 through the keyboard 52 in the order of magnitude of the QL data, e.g., from the left of the step-wedge. When the measured halftone dot percentage data are inputted, they correspond to the QL data that are outputted by the image output device 16, as indicated by spots x plotted in FIG. 1.

Figure 1:
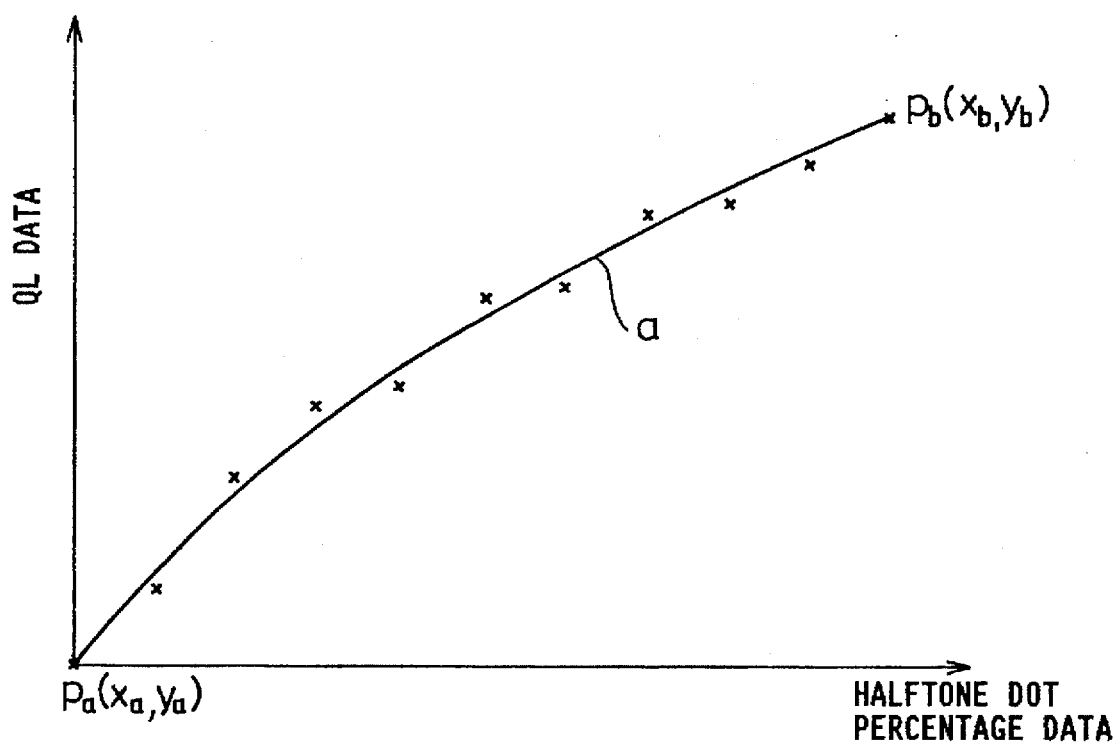
FIG. 1 is a diagram illustrative of a least square approximation according to the principles of the present invention.

The halftone dot percentage data vs. QL data shown in FIG. 1 are approximated in a least square approximation by an m-th order polynomial, on the condition that it passes through a starting point Pa (minimum value) and an ending point Pb (maximum value), as follows:

The calculation of the function equation will be described below.

A general form of the m-th order polynomial is given by:

$$y = \sum_{k=0}^{m} c_k x^k. \tag{1}$$

It is assumed that the equation (1) passes through preset two points, i.e., a starting point Pa (xa, ya) and an ending point Pb (xb, yb) (xa≠xb). The coordinates ya, yb are expressed as follows:

$$y_a = \sum_{k=0}^{m} c_k x_a^k \tag{2}$$

$$y_b = \sum_{k=0}^{m} c_k x_b^k.$$

When m=1, the equation (1) is uniquely defined. The equations (2) are solved as follows:

$$y = c_0 + c_1 x$$

$$c_0 = (x_b y_a - x_a y_b)/(x_b - x_a)$$

$$c_1 = (y_b - y_a)/(x_b - x_a). \tag{3}$$

When m≥2, two $c_0$, $c_1$ of the coefficients $c_k$ are determined according to the equations (2). Specifically, when the equations:

$$y_a - \sum_{k=2}^{m} c_k x_a^k = c_0 + c_1 x_a \tag{4}$$

$$y_b - \sum_{k=2}^{m} c_k x_b^k = c_0 + c_1 x_b$$

are solved for $c_0$, $c_1$, they are determined as follows:

$$\begin{pmatrix} c_0 \\ c_1 \end{pmatrix} = \frac{1}{x_b - x_a} \begin{pmatrix} x_b & -x_a \\ -1 & 1 \end{pmatrix} \begin{pmatrix} y_a - \sum_{k=2}^{m} c_k x_a^k \\ y_b - \sum_{k=2}^{m} c_k x_b^k \end{pmatrix}. \tag{5}$$

When the m-th degree equation (1) becomes a least square equation (m<N+2) for N points, this problem is equivalent to determining $c_2 \sim c_m$ which minimize the equation:

$$\epsilon = \sum_{i=0}^{N-1} \left( y_i - \sum_{k=0}^{m} c_k x_i^k \right)^2 \tag{6}$$

with respect to the measured halftone dot percentage data $p_i$ ($x_i$, $y_i$) ($i=0 \sim N-1$, $p_i \neq p_j$, $i \neq j$). Thus, with respect to $n=2 \sim m$, the following equation is satisfied:

$$\frac{\partial \epsilon}{\partial c_n} = \sum_{i=0}^{N-1} \left( -2y_i \left( \frac{\partial c_0}{\partial c_n} + \frac{\partial c_1}{\partial c_n} x_1 = x_1^n \right) + 2 \sum_{k=0}^{m} c_k x_i^k \left( \frac{\partial c_0}{\partial c_n} + \frac{\partial c_1}{\partial c_n} x_i + x_i^n \right) \right) = 0. \tag{7}$$

Using the following equations (8) and (9), $$\sum_{k=0}^{m} c_k x_i^k = c_0 + c_1 x_i + \sum_{k=2}^{m} c_k x_i^k \tag{8}$$

$$= \frac{1}{x_b - x_a} ((x_i - x_a)y_b - (x_i - x_b)y_a) + \frac{1}{x_b - x_a} \sum_{k=2}^{m} c_k (-(x_a^k x_b - x_a x_b^k) + x_i(x_a^k - x_b^k) + x_i^k),$$

$$\frac{\partial c_0}{\partial c_k} = -\frac{1}{x_b - x_a} (x_a^k x_b - x_a x_b^k), \tag{9}$$

$$\frac{\partial c_1}{\partial c_k} = \frac{1}{x_b - x_a} (x_a^k - x_b^k),$$

the equation (7) is expressed as follows:

$$\sum_{i=0}^{N-1} \left( \frac{\partial c_0}{\partial c_n} + \frac{\partial c_1}{\partial c_n} x_i + x_i^n \right) \sum_{k=2}^{m} c_k \left( \frac{\partial c_0}{\partial c_k} + \frac{\partial c_1}{\partial c_k} x_i + x_i^k \right) = \tag{10}$$

$$\sum_{k=2}^{m} c_k \left( \sum_{i=0}^{N-1} \left( \frac{\partial c_0}{\partial c_n} + \frac{\partial c_1}{\partial c_n} x_i + x_i^n \right) \left( \frac{\partial c_0}{\partial c_k} + \frac{\partial c_1}{\partial c_k} x_i + x_i^k \right) \right) =$$

$$\sum_{i=0}^{N-1} \left( \frac{\partial c_0}{\partial c_n} + \frac{7 c_1}{\partial c_n} x_i + x_i^n \right) \left( y_i - \frac{1}{x_b - x_a} ((x_i - x_a)y_b - (x_i + x_b)y_a) \right).$$

If the following equations (11) and (12) are satisfied, $$X_{kn} = \sum_{i=0}^{N-1} \left( \frac{\partial c_0}{\partial c_n} + \frac{\partial c_1}{\partial c_n} x_i + x_i^n \right) \left( \frac{\partial c_0}{\partial c_k} + \frac{\partial c_1}{\partial c_k} x_i + x_i^k \right), \tag{11}$$

$$Y_n = \sum_{i=0}^{N-1} \left( \frac{\partial c_0}{\partial c_n} + \frac{\partial c_1}{\partial c_n} x_i + x_i^n \right) \left( y_i - \frac{1}{x_b - x_a} ((x_i - x_a)y_b - (x_i + x_b)y_a) \right), \tag{12}$$

then the normal equation is given as follows:

$$\sum_{k=2}^{m} c_k X_{kn} = Y_n. \tag{13}$$

Simultaneous equations are established with respect to $n=2 \sim m$, and solved for $c_k$, the function equation is determined.

A correction table is generated according to the function equation. The degree m will be described below.

If $\delta$ is a predetermined value, then with m=1, i.e., a first degree polynomial, when the relationship:

$$\delta_i = |y_i - (c_0 + c_1 x_i)| \leq \delta \tag{14}$$

is satisfied with respect to all i ($i \neq a$, $i \neq b$), $\delta_i$ falls in the predetermined value 6 by an approximation according to the first degree polynomial because $y = c_0 + c_1$ in the equations (3) above. By being approximated by the first degree polynomial, the image data with respect to the halftone dot percentage data are written in the correction table storage circuit 44 correspondingly to the halftone dot percentage data, thus generating the correction table. When the relationship:

$$\delta_i = |y_i - (c_0 + c_1 x_i)| > \delta \tag{15}$$

is satisfied with respect to at least one i, the degree m is incremented by "1", and a second degree polynomial is calculated, approximating the image data, as follows:

$$y = c_0 - c_1 x + c_2 x^2. \tag{16}$$

As a consequence, when the general formula:

$$\delta_i = |y_i - \sum_{k=0}^{m} c_k x_i^k| \leq \delta \tag{17}$$

is satisfied with respect to all i ($i \neq a$, $i \neq b$), $\delta_i$ falls in the predetermined value 6 by an approximation according to the second degree polynomial. By being approximated by the second degree polynomial, the correction table is generated likewise. When the general formula:

$$\delta_i = |y_i - \sum_{k=0}^{m} c_k x_i^k| > \delta \tag{18}$$

is satisfied with respect to at least one i, the degree m is incremented by "1", and a polynomial with next degree is calculated, approximating the image data similarly.

The curve based on a polynomial with a degree at the time $\delta_i \leq \delta$ is as indicated by a, for example, in FIG. 1.

Although a certain preferred embodiment of the present invention has been shown and described in detail, it should be understood that various changes and modifications may be made therein without departing from the scope of the appended claims.

What is claimed is:

1. A method of producing a correction table to be referred to when an input image data having a first attribute is converted into an image data having second attribute, said method comprising steps of:

measuring values of the first attribute data obtained by processing with a given image output device, reference image data of the second attribute having a plurality of data values arranged at predetermined data intervals;

determining an approximation formula of a desired function form for approximating the measured values of the first attribute data by the method of least squares, on the condition that the formula passes through preset starting and ending points, said determining step including determining the maximum difference between said measured values and approximation values calculated by the approximation formula; and producing the correction table based on said approximation formula, wherein said desired form of the approximation formula is a polynomial with a prescribed degree, and said step of determining the approximation formula further includes the steps of:

incrementing the degree of the polynomial by 1, if the determined maximum difference exceeds a predetermined allowable range;

repeating said step of determining the approximation formula until said maximum difference falls within said allowable range; and determining said polynomial with a degree at the time said maximum difference falls within said allowable range as being a resulted approximation formula.

2. A method according to claim 1, wherein said first attribute data is halftone dot percentage data.

3. A method according to claim 1, wherein said second attribute data is quantum level (QL) data.

4. A method according to claim 3, wherein said first attribute data is halftone dot percentage data.

5. An apparatus for producing a correction table to be referred to when an input image data having a first attribute is converted, into an image having second attribute data, said apparatus comprising:

correction table storage means for storing a correction table;

reference image data generating means for outputting reference image data of the second attribute having a plurality of data values arranged at predetermined data intervals;

measuring means for measuring values of the first attribute data obtained by processing with a given image output device, reference image data of the second attribute having a plurality of data values arranged at predetermined data intervals;

calculating means for determining an approximation formula of a desired function form for approximating the measured values of the first attribute data by the method of least squares, on the condition that the formula passes through preset starting and ending points, said calculating means including subtracting means for determining the maximum difference between said measured values and corresponding approximation values calculated from the approximation formula;

correction table producing means for producing the correction table from said approximation formula; and write controlling means for storing the correction table data in said correction table storage means.

6. An apparatus according to claim 5, wherein said desired form of the approximation formula is a polynomial with a prescribed degree, and said calculating means further including:

repetitively instructing means for incrementing the degree of the polynomial by 1, if the maximum difference exceeds a predetermined allowable range, repeating the operations of said calculating means and subtracting means until the maximum difference falls within said allowable range, and determining said polynomial with a degree at the time the maximum difference falls within said allowable range as being a resulted approximation formula.

7. An apparatus according to claim 5, wherein said first attribute data is halftone dot percentage data.

8. An apparatus according to claim 5, wherein said second attribute data is quantum level (QL) data.

9. An apparatus according to claim 8, wherein said first attribute data is halftone dot percentage data.

10. An apparatus according to claim 6, wherein said first attribute data is halftone dot percentage data.

11. An apparatus according to claim 6, wherein said second attribute data is quantum level (QL) data.

12. An apparatus according to claim 11, wherein said first attribute data is halftone dot percentage data.

* * * * *